United States Patent Office 3,117,125
Patented Jan. 7, 1964

3,117,125
REACTION PRODUCTS CONTAINING CHARGE TRANSFER COMPLEXES (AZINE AND CHLOR-ANIL COMPOSITIONS)
Abraham Wilson, Millstone, N.J., assignor to American Cyanamid Company, New York, N.Y., a corporation of Maine
No Drawing. Filed Aug. 15, 1961, Ser. No. 131,506
3 Claims. (Cl. 260—243)

This invention relates to new compositions of matter and more particularly to reaction products derived from azine donor materials and a haloanil electron acceptor.

Still more specifically the new compositions are reaction products derived from (1) phenothiazines of the formula

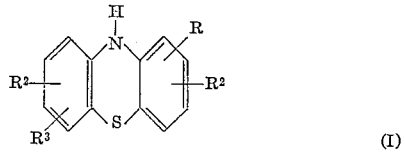

(I)

wherein each of R, $R^1$, $R^2$ and $R^3$ is individually selected from the group hydrogen, halo (especially a halogen of atomic weight greater than 19, e.g., chloro, bromo or iodo), alkyl (especially lower alkyl) and haloalkyl (e.g., trichloromethyl, dichloromethyl and trifluoromethyl); and (2) an ortho- or para- haloanil represented by the Formulae II:

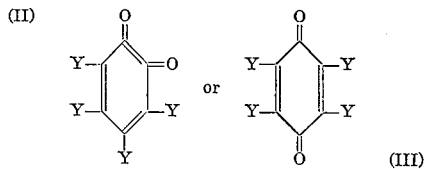

wherein Y is chloro, bromo or iodo.

The compositions of this invention are reaction products of a compound of Formula I with a compound of either Formula II or III containing solid charge transfer complexes which may be represented by the formula $$[D]_n[A] \qquad (IV)$$

wherein D is a phenothiazine of Formula I, A is a haloanil of Formula II or III and $n$ is 1, 2 or 3. The exact nature of the bonds which join the D and A molecules is not known, but it is hypothesized that the components of the complex are joined by ionic (or intermolecular) forces such as were treated quantum mechanically by Mulliken, Rec. trav. chim., volume 75845 (1956). On the basis of the observation that the reaction products of the present invention show a high concentration of unshared electrons, as indicated both by their free spin values, and their ability to act as electrical semi-conductors, it is further theorized that these complexes are not the result of covalent bonding.

In preparing the new compositions, a compound of Formula I is mixed with a haloanil compound of Formula II or III and the mixture is heated to a temperature of from about 75° C. to about 400° C. (preferably around 100° C.) under vacuum of a few mm. Usually from 16 hours to 48 hours time is required for the reaction to be complete. The reaction may be conveniently conducted in a vacuum sublimer.

An advantage of this invention is that the proportions of the azine and the acceptor which are reacted, are not critical. An excess of either the azine donor or the haloanil acceptor may easily be removed from the reaction product simply by continued heating, whereby the excess of either one may be sublimed off while the reaction product itself, remains. For such sublimation, a vacuum sublimation chamber which will maintain the reaction product at a temperature of 100° C. and the pressure in the system at a few mm. may be employed.

In forming the products of this invention, the starting materials need not necessarily be in the form of dried solids but may also be combined from the molten state, from the vapor state or from solution in inert organic solvents such as acetone, benzene, etc.

For certain purposes, it may sometimes be convenient to form the products in the vapor state or through films, for example through the interaction of a thin film of one component on a substrate, with the vapor of the other reactant. Thus, in forming a semiconducting device, it is possible to deposit a thin film of the one component on a substrate and then contact this film with the vapor of the other component. Completion of the reaction between the components may be assured by heat aging or treatment with the vapor of a solvent such as acetone.

The new products are green to dark blue, heat stable (up to 400° C. or more) solids which have semiconductor properties and because of their specific electrical properties are useful, for example, in electronic devices which require a material with a specified resistance or conductivity. Moreover, because of their deep color and specific electrical properties they are useful in photo-conductivity devices.

Further, the material may be used as pigments in various systems due to their low solubility and green to blue color; or as fillers in plastic compositions, for example, especially where specially defined electrical properties are required as to resistance and high free electron concentration. Still further, they are useful as heterogeneous free radical catalysts, e.g., as catalysts for the polymeriaztion of styrene to resinous polymers.

The invention is further illustrated by the examples which follow.

EXAMPLE 1

Reaction Product From Phenothiazine and Para-Chloranil

Phenothiazine (0.50 g.) and p-chloranil (1.042 g.) were mixed and ground together and the mixture placed in a vacuum sublimer. The temperature was maintained at 100° C. and the pressure at a 0.1 mm. for 16 hours. The residual mass was reground and the vacuum heating continued for a three-hour period. After this operation the residue was again ground and replaced in the sublimer for an additional three hours. The dark, brittle mass which results is soluble in acetone, giving a blue color. Analysis shows 3 moles of phenothiazine to 1 mole p-chloranil ratio. Unshared electron concentration is $5 \times 10^{19}$ free spins/g.

Following the procedure of Example 1 except for the use of an equivalent amount of 2-methylphenothiazine, there is obtained the corresponding charge transfer complex having a high unshared electron concentration.

EXAMPLE 2

Reaction Product From Phenothiazine and Ortho-Chloranil

One gram of phenothiazine and 0.6 gram of o-chloranil were ground in a mortar and heated in a vacuum sublimer at 100° C. and 0.1 mm. pressure. A green colored melt is rapidly formed. o-Chloranil sublimes into the cool sleeve of the sublimer. The vacuum heating was continued over a period of 48 hours. The resulting blue black solid in acetone, produces a blue solution which gradually turns deep green. The spin concentration of this sample is $2 \times 10^{20}$ free spins/g.

Substitution of 2,6-dichlorophenothiazine in the procedure of Example 2, gives the corresponding charge transfer complex.

I claim:
1. A charge transfer complex of the formula:

$$[D]_n[A]$$

wherein D is an azine of the formula:

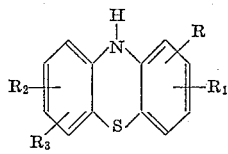

each of R, $R_1$, $R_2$ and $R_3$ being a member selected from the group consisting of hydrogen, halogen of atomic weight greater than 19, lower alkyl and lower haloalkyl; A is a member selected from the group consisting of orthohaloanil and para-haloanil wherein the halo radicals have an atomic weight greater than 19; and $n$ is a positive integer less than four.

2. The charge transfer complex consisting essentially of 1-3 moles of phenothiazine and parachloranil.

3. The charge transfer complex consisting essentially of 1-3 moles of phenothiazine and orthochloranil.

References Cited in the file of this patent

Kainer: Naturwissenschaften, vol. 41, pages 303–4 (1954).

Kainer et al.: Chemische Berichte, vol. 88, pages 1921–31 (1955).

Fister: Nature, vol. 81, pages 337–8 (1958).